(12) United States Patent
Schleifstein et al.

(10) Patent No.: US 12,508,649 B2
(45) Date of Patent: Dec. 30, 2025

(54) METHOD FOR PRODUCING A SINTERED COMPONENT

(71) Applicant: SCHUNK SINTERMETALLTECHNIK GMBH, Heuchelheim (DE)

(72) Inventors: Franz-Josef Schleifstein, Schmallenberg (DE); Johannes Heyde, Wetzlar (DE); Torsten Wendt, Wetzlar (DE)

(73) Assignee: SCHUNK SINTERMETALLTECHNIK GMBH, Heuchelheim (DE)

( * ) Notice: Subject to any disclaimer, the term of this patent is extended or adjusted under 35 U.S.C. 154(b) by 362 days.

(21) Appl. No.: 18/246,098

(22) PCT Filed: Oct. 23, 2020

(86) PCT No.: PCT/EP2020/079865
§ 371 (c)(1),
(2) Date: Mar. 21, 2023

(87) PCT Pub. No.: WO2022/083874
PCT Pub. Date: Apr. 28, 2022

(65) Prior Publication Data
US 2023/0356295 A1    Nov. 9, 2023

(51) Int. Cl.
*B22F 5/08* (2006.01)
*B22F 3/16* (2006.01)
*B22F 3/24* (2006.01)

(52) U.S. Cl.
CPC .............. *B22F 5/08* (2013.01); *B22F 3/164* (2013.01); *B22F 3/24* (2013.01);
(Continued)

(58) Field of Classification Search
None
See application file for complete search history.

(56) References Cited

U.S. PATENT DOCUMENTS

| | | | | |
|---|---|---|---|---|
| 4,111,031 A | * | 9/1978 | Vennemeyer | B23P 15/14 72/359 |
| 8,474,295 B2 | * | 7/2013 | Schmid | B22F 3/164 72/359 |

(Continued)

FOREIGN PATENT DOCUMENTS

| | | | |
|---|---|---|---|
| DE | 102014112692 A1 | | 3/2015 |
| DE | 102019000138 A1 | * | 7/2019 ............... B22F 3/03 |

OTHER PUBLICATIONS

International Search Report, dated Jun. 18, 2021, corresponding to International Application No. PCT/EP2020/079865.

*Primary Examiner* — Devang R Patel
(74) *Attorney, Agent, or Firm* — Ladas & Parry LLP; Malcolm J. MacDonald

(57) ABSTRACT

A method for producing a sintered component in the form of a workpiece having teeth, wherein crowning, with a central region and end regions, is formed in flanks of teeth, the tooth thickness being smaller in at least one of the end regions than in the central region of the flanks. In order to form the crowning, at least one pressing punch acts on the teeth, which are located in a die, along a first axis such that the teeth are sized at least to the central region by means of axial pressing.

15 Claims, 3 Drawing Sheets

Figure 1:
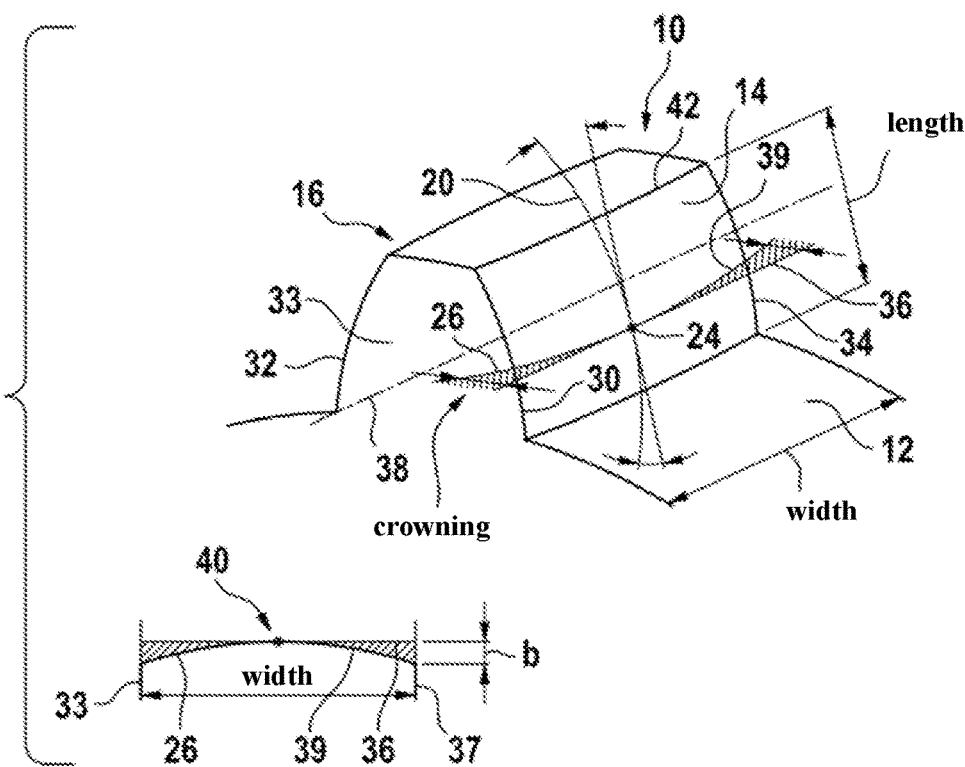

(52) U.S. Cl.
CPC ..... *B22F 2003/248* (2013.01); *B22F 2301/35* (2013.01); *B22F 2304/10* (2013.01); *B22F 2998/10* (2013.01)

(56) References Cited

U.S. PATENT DOCUMENTS

| | | | | |
|---|---|---|---|---|
| 8,911,313 | B2* | 12/2014 | Schmid | B21H 5/022 |
| | | | | 474/160 |
| 11,000,898 | B2* | 5/2021 | Roessler | B22F 3/164 |
| 2008/0201951 | A1* | 8/2008 | Kotthoff | B22F 3/164 |
| | | | | 419/28 |
| 2009/0317582 | A1* | 12/2009 | Schmid | B22F 3/24 |
| | | | | 428/66.1 |
| 2011/0132057 | A1 | 6/2011 | Schmid et al. | |
| 2016/0214178 | A1 | 7/2016 | Weiermair et al. | |
| 2017/0165755 | A1 | 6/2017 | Roessler et al. | |

* cited by examiner

METHOD FOR PRODUCING A SINTERED COMPONENT

The invention relates to a method for producing a sintered component, in particular a workpiece having teeth, by means of pressing along a first axis.

In particular, the invention relates to a method for producing a sintered component in the form of a workpiece having teeth, such as a gear, with crowning having a central region and end regions being formed in the flanks of the teeth, the tooth thickness being smaller in at least one of the end regions than in the central region of the flanks.

In order to produce precision gears from a sintered material, it is known to compact and then sinter a sinter powder. In order to achieve the desired strength in the flanks, the tooth flank is first compacted by rolling. A hardening process then takes place. In order to form a crowning on the flanks, the tooth flanks are then ground or honed.

Corresponding procedures are complex and expensive. It is also shown that the gears have a significant density gradient, since the density is increased by rolling only in the region of the teeth.

EP 2 066 468 B2 discloses a method for compacting a surface of a sintered part, such as a gear, in which the sintered part is pressed through a die that has a stepwise decreasing inner diameter. This results in a compaction in the edge region. After compaction has taken place, the sintered part is pressed through a calibration plate in order to calibrate the sintered part, i. e. to shape it to an exact fit.

The present invention is based on the object of further developing a method of the type mentioned at the outset in such a way that a sintered component, in particular a workpiece having teeth, preferably a gear, is made available which, compared to the prior art, is easier to produce and in particular, after the pressing, actually does not require any post-processing to give it a shape.

In order to achieve the object, the invention essentially provides that, in order to form a section of the sintered component with a crowned region with end regions and a central region running between them, its distance from a straight line running inside the section, outside the region and parallel to the first axis is greater than that of the end regions, that the section is or will be arranged in a die, and that at least one pressing punch acts on the section along the first axis in such a way that the crowned region is calibrated at least up to the central region.

The term crowning includes a symmetrical and asymmetrical crowning. The curved or bent region running along the width of the tooth flank can also only be provided in the edge regions, whereas a straight course can be provided in the central region.

In particular, it is provided that in order to completely form the crowning from end region to end region, the at least one pressing punch acts on the section in two positions of the section rotated by 180° about a second axis running perpendicular to the first axis. In particular, the die is the shaping tool, although the pressing punch can also be the shaping tool.

Alternatively, in order to produce the section having the crowning, it is provided that at least two pressing punches are adjusted along the first axis and act on the section on opposite sides. The two pressing punches are the shaping tool.

In particular, the invention relates to a method in which at least one pressing punch acts on the teeth located in a die along a first axis in order to form the crowning in such a way that the teeth are calibrated at least up to the central region.

In particular, it is provided that for the complete formation of the crowning from end region to end region of the teeth, the at least one pressing punch acts on the teeth in two positions of the workpiece rotated by 180° about a second axis running perpendicular to the first axis.

There is also the possibility that at least two pressing dies are adjusted relative to one another along the first axis, which pressing dies act on opposite sides of the teeth for calibrating the crowning.

When manufacturing gears as sintered components, the challenge has to be met that the flanks have a surface profile, that, in addition to the height crowning in which the tooth flanks are modified along the involutes, a width crowning in the tooth flanks is also generated, so that the ideal point of contact between two gears is on the theoretical center of the tooth flank. At the same time, when machining the flanks, attention must be paid to the tolerance quality of the diametral two ball dimension, which is an influencing variable for noise behavior. All of this is achieved on the basis of the teaching according to the invention, since the crowning is calibrated by axial pressing, i. e. it is formed to an exact fit during pressing.

According to the invention, there is the possibility that axial pressing, regardless of the undercut resulting from the crowning in relation to the pressing direction, forms the crowning while at the same time calibrating the workpiece, be it by that the workpiece is subjected to the pressing process in positions rotated by 180° about an axis running perpendicular to the pressing direction to achieve the crowning, be it that pressing punches acting on the workpiece from both sides of the workpiece along a common axis are used.

In case of a gear, the axis about which the workpiece is rotated by 180°, is also in a plane spanned by said gear.

Both possible solutions ensure that the required crowning is produced during pressing without the need for honing or grinding, which is required according to the prior art.

In principle, the height crowning is already formed during one or more preceding pressing processes.

A sintering powder that is based on an iron material with application-oriented additives, in particular copper and carbon, is particularly suitable.

The iron-based material can contain one or more materials from the group consisting of Mo, Ni, Cu, Cr, Mn, Si, B, P, C.

In order to achieve the crowning that forms the undercuts on the flanks of teeth, the die can be a shaping tool. In this case, the section in which the crowning is to be formed is pressed against a section of the die in order to achieve a reduction in the width of the tooth in an end region, i. e. in the front edge region of the flank.

In order to avoid repositioning by 180°, it is possible to have a pressing punch act on opposite sides of the workpiece, which in turn causes the necessary material displacement.

In order to form the crowning, the tooth is fixed between further punches when using two pressing punches acting on opposite sides of the tooth, each of which bears against the end faces of the tooth.

If the pressing punches act on opposite sides of the workpiece, a further refinement of the invention that should be emphasized provides that during the adjustment of the pressing punches an element preventing or inhibiting a cross-sectional enlargement of the section acts on the central region of the region to be crowned.

The invention also provides that, after pressing, it is not necessary to compact the compact or base body at the edges, for example by rolling. Rather, it is provided in particular that the mixed sintering powder is compacted to a density D1 in a first pressing step, that the compacted compact is subjected to a first sintering, that the sintered preform is then compacted to a density D2 in a second compaction step, and that the compacted sintered preform is then sintered, then calibrated and finally hardened.

Thus, a compact and consequently also a sintered body is available, which has a substantially homogeneous density and not the density gradient, which is strongly pronounced according to the prior art, since in the case of gears as sintered bodies, according to the prior art, they are additionally compacted, in principle, only in the region of the teeth, e. g. by rolling. According to the prior art, there is the further disadvantage that a crowning takes place after the tooth has hardened.

In particular, it is provided that the density D1 is adjusted to a value between 6.8 and 7.0 g/cm$^3$, in particular a value between 6.8 and 6.9 g/cm$^3$, and/or the density D2 is adjusted to a value between 7.3 and 7.6 g/cm$^3$, in particular 7.4 to 7.5 g/cm$^3$.

In particular, the sintering powder used should have a particle size of less than 250 µm. The grain size D50 should be between 50 µm and 120 µm.

An iron-based material that can contain one or more materials from the group consisting of Mo, Ni, Cu, Cr, Mn, Si, B, P, C is particularly suitable as the sintering powder.

If, according to the invention, the calibration, i. e. the shaping to an exact fit, is carried out during the inventive shaping of the crowning of a tooth of a workpiece having teeth, in order to then carry out a hardening process by e. g. induction, carbonitriding, case hardening, the invention of course does not rule out that the hardening step is carried out before the calibration process, which hardening step can then also be sinter hardening.

Based on the teaching according to the invention, there is also the possibility of shaping end reliefs, i. e. a tooth thickness reduction, at the lower and/or upper edge of the tooth by axial pressing. Process steps and measures are used here, as disclosed in connection with the formation of the crowning. The shaping of the end reliefs is according to the invention.

The invention also contemplates crowning with a curved geometry being formed by axial pressing at one end in the tooth flank in the direction of the tooth width towards the central region of the tooth flank, whereas a corresponding shaping does not take place at the opposite end of the flank.

Additional details, advantages and features of the invention will be apparent not only from the claims and the features specified therein, alone and/or in combination, but also from the following description of preferred exemplary embodiments illustrated in the drawings.

Figure 2:
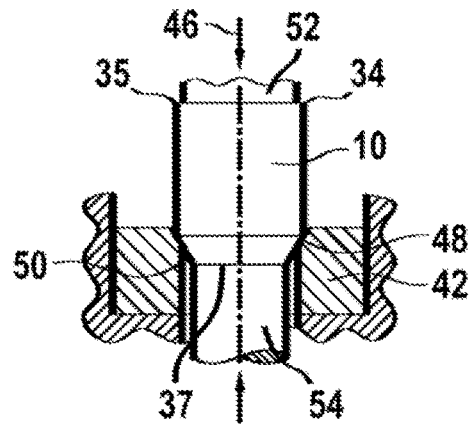
Figure 3:
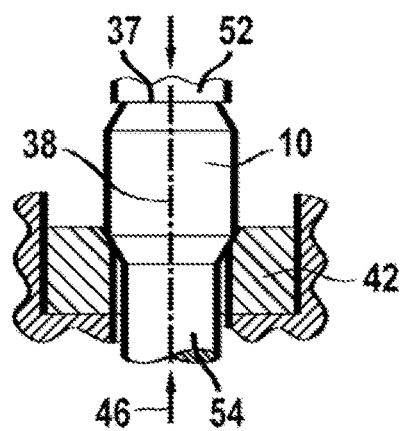
Figure 4:
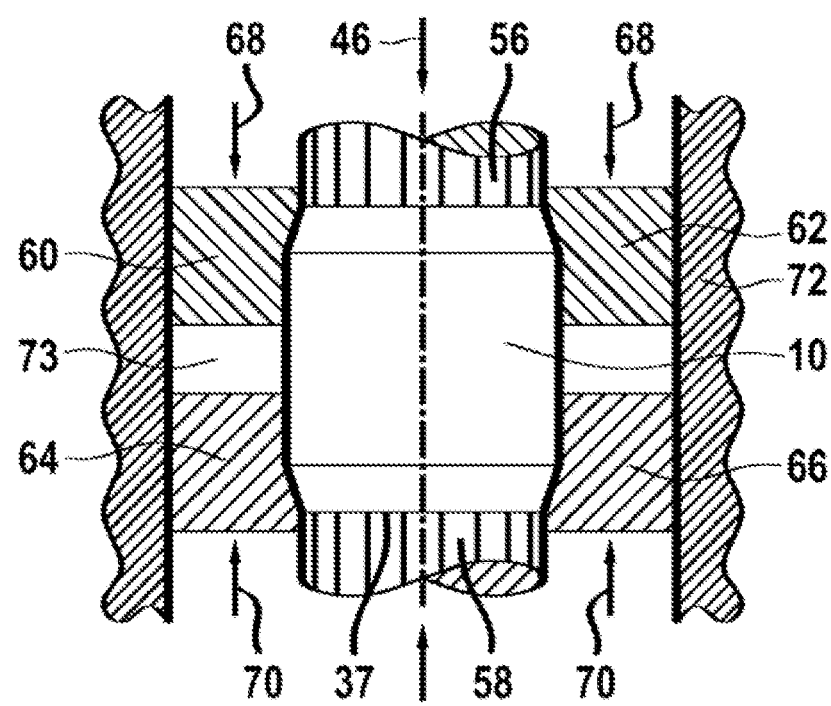
Figure 5:
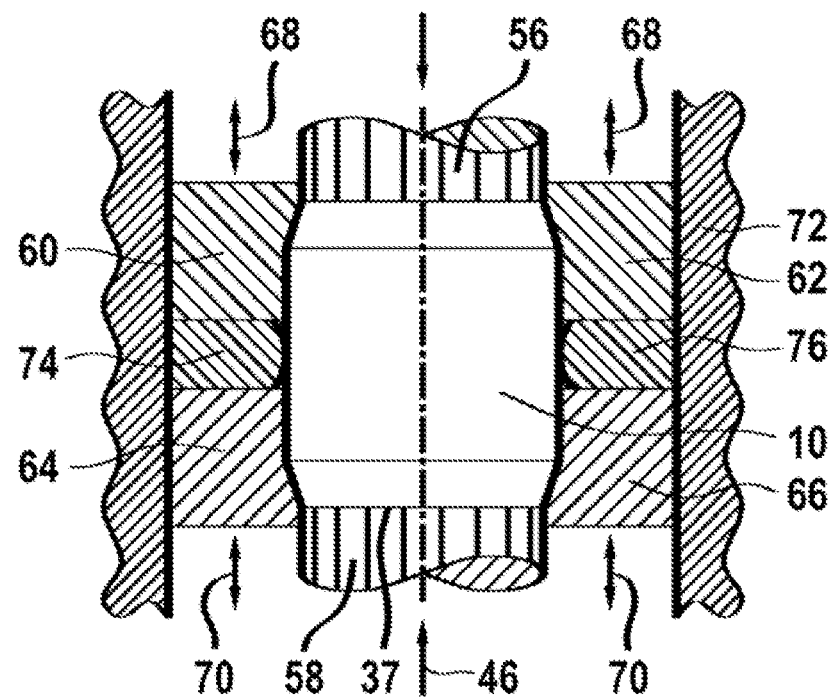
Figure 6:
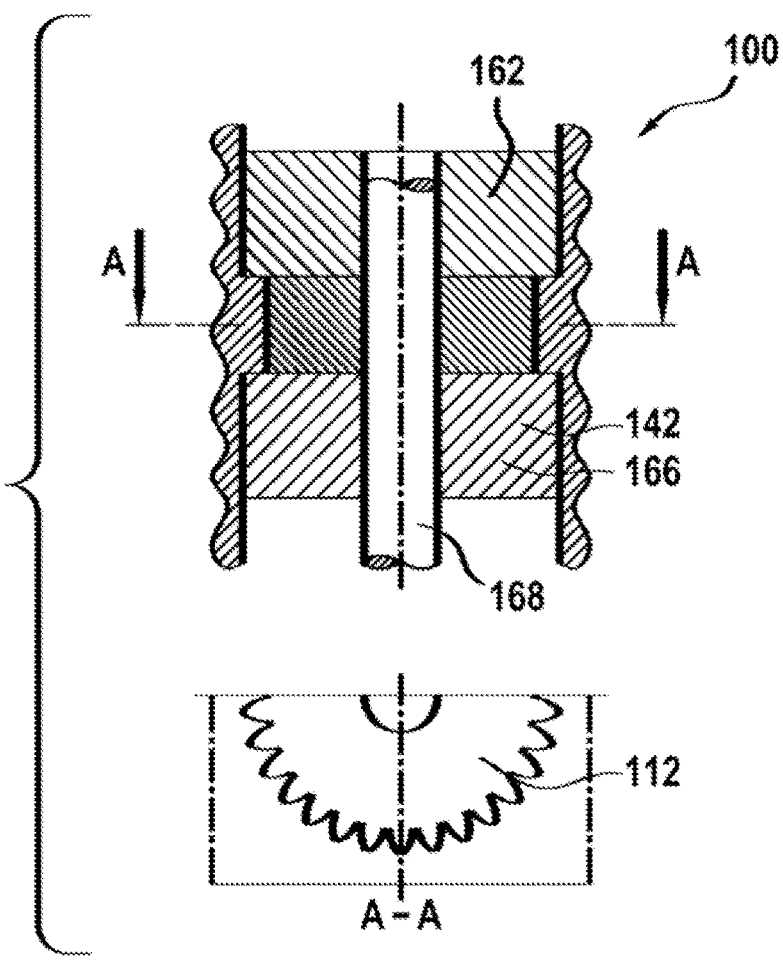
Figure 7:
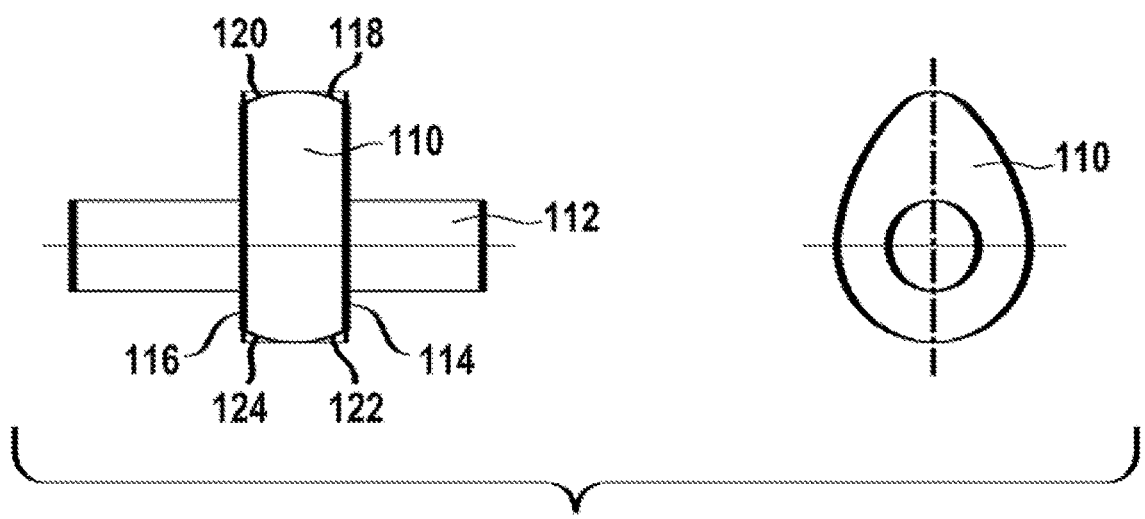

In the drawings:

FIG. 1 shows a tooth of a gear,

FIG. 2 shows a schematic representation of a first embodiment for forming a crowning of teeth of a gear in detail, FIG. 3 shows the arrangement according to FIG. 2 with the gear rotated by 180°, FIG. 4 shows a second embodiment of an arrangement for forming a crowning, FIG. 5 shows a third embodiment of an arrangement for forming a crowning, FIG. 6 shows a schematic representation of a pressing tool, and FIG. 7 shows a cam having a crowning.

FIGS. 1-5 will be used as an exemplary embodiment—that is, without limiting the invention—to explain in principle the calibration of at least one flank of a tooth of a straight-toothed gear, in particular both flanks of the teeth, in the flanks of which a crowning is shaped by an axial pressing process. The gear is a sintered component that is produced in a shaping process without the gear rim being ground or honed to form a crowning, as is the case in the prior art. Rather, the desired crowning is achieved through the shaping process of pressing with simultaneous calibration, i.e. shaping to an exact fit. In addition to the crowning, the corresponding flanks can also have a height crowning running along the involutes, which is previously shaped in a pressing process.

If the invention is explained purely by way of example using a straight-toothed gear, the teaching according to the invention is also possible for helical-toothed gears. The axial pressing process is superimposed by a relative rotary movement between the pressing punch and the die. Calibration is carried out using the pressing punch.

According to the usual production of sintered bodies, sinter powder is first mixed and pressed. A sintering powder that is based on an iron material with application-oriented additives, in particular copper and carbon, is particularly suitable.

The iron-based material can contain one or more materials from the group consisting of Mo, Ni, Cu, Cr, Mn, Si, B, P, C.

The grain size of the powder particles should be less than 250 µm, with D50 being between 50 µm and 120 µm.

In a first pressing step, the powder is pressed in a die, with the inner contour of the die corresponding to the outer contour of the gear. Values between 400 MPa and 1,200 MPa, in particular in the range between 600 MPa and 1,000 MPa, can be considered as the pressing pressure. A first sintering step then took place in the temperature range between 600° C. and 1,300° C., in particular in the range between 700° C. and 900° C., provided the sinter powder consists of an iron-based material.

Pressing, sintering temperature and duration are set in such a way that a density between 6.8 g/cm$^3$ and 7.0 g/cm$^3$, in particular between 6.8 g/cm$^3$ and 6.9 g/cm$^3$ is obtained.

In order to increase the density, a second pressing and sintering step is carried out to obtain a density ranging between 7.3 g/cm$^3$ and 7.6 g/cm$^3$, in particular between 7.4 g/cm$^3$ and 7.5 g/cm$^3$, a prerequisite for being able to produce high-precision gears.

In a subsequent pressing step, at least one flank of each tooth, preferably each flank of each tooth, is calibrated according to the invention, with simultaneous formation of the desired crowning.

FIG. 1 shows a tooth 10 of a gear 12, in flanks 14, 16 of which, in addition to a height crowning 20 running along the involute, a width crowning 26 is also to be formed, height crowning 20 and width crowning 26 intersecting at a point 24.

Height crowning 20 is shaped in a preceding pressing process, in which gear 12 is shaped by axial pressing, the pressing direction of which coincides with the normal of a plane spanned by the gear, in the exemplary embodiment with end faces 33, 34, 37 of teeth 10 emanating normals.

The width b of crowning 26 is the difference between the highest and the lowest point of the line that specifies the crowning.

The crowning is consequently an intended deviation of the tooth flank from its theoretical shape in the direction of the tooth width, so that actual flank line 39 is curved toward the central region, i. e. in the direction of intersection point 24. In the region of edges 30, 32, 34, 35 (end regions of crowning 26), the difference between a flank line 36, which corresponds to flank 14 without crowning and in which intersection point 24 is located, and the actual flank line (straight line 26) depends on the tooth width and diameter of the gear. The width b of the crowning at its ends, i. e. in the edges 30, 32, 34, 35, can be between 0.003 mm and 0.005 mm or 0.006 mm and 0.012 mm or 0.008 mm and 0.016 mm. In general, the width b of the crowning is in the range between 0.003 mm and 0.016 mm, without the invention being limited by corresponding numerical values.

It is not necessary for flank 14 to be at a distance from straight line 36 over the entire length of flank 14 in which the highest point of crowning 26 is located.

Straight line 36 runs along longitudinal axis 38 of tooth 10, which extends along the axis referred to as the first axis, along which the axial pressing operation is carried out. Thus, the distance of crowning 26 in the region of flank edges 30, 32 or 34, 35 to longitudinal axis 38 is smaller than in adjoining center region 40, in which intersection point 24 is located. This is also evident from the detailed drawing in FIG. 1.

Central region 40 can be formed as a plateau, i. e. material has only been displaced in the region of edges 30, 32, 34, 35 as a result of the pressing process carried out.

Height crowning 20 has a height h in the region of the top of longitudinal edge 42 of tooth 10.

In order to produce desired crowning 26, there are several process options through axial pressing, which will be explained with reference to FIGS. 2 to 5.

A longitudinal section through tooth 10 is shown in FIGS. 2 to 5 in each case.

In FIG. 2, the shaping in the region of edges 30, 32 of tooth 10 and in FIG. 3 in the region of edges 34, 35 is shown in principle. Thus, tooth 10 of pressed and sintered gear 10 is supported by a lower punch 54 before tooth 10 is axially pressed by an upper punch 52 into a section of a die 42 serving as a shaping tool. In the case of a straight-toothed gear, pressing direction 46 runs parallel to longitudinal axis 38 of tooth 10 and to straight line 36.

For this purpose, the die has the negative shape of the flank regions to be modified by changing the material in order to achieve crowning 26. Tooth 10 is pressed in the direction of die 42, with the shaping taking place at the same time, as beveled regions 48, 50 of tooth 10 illustrate purely in principle.

In the figures, die 42 is shown purely in principle in order to clarify the process.

After forming sectional crowning in flanks 14, 16, tooth 10 is rotated by 180° about an axis running perpendicularly to pressing direction 46 and lying in a plane spanned by the gear, in order to then displace material in the region of edges 34, 35 of flanks 14, 16, as can be seen in principle from FIG. 3.

Alternatively, there is the possibility of forming the crowning by means of upper and lower punches, which act simultaneously on the edge regions of flanks 14, 16. This will be described in reference to FIGS. 4 to 5.

Thus, in FIG. 4, tooth 10 is fixed between a first upper punch 56 and a first lower punch 58. In order to carry out the desired shaping in the region of edges 30, 32, 34, 35, two upper and lower punches 60, 62 and 64, 66 are used in each case, which are moved towards one another in directions 68, 70 running parallel to first axis 46 (see arrows), the two upper and lower punches 60, 62 and 64, 66 being guided by boundary walls of a die 72.

The two upper punches 60, 62 can be referred to as first punches, and the two second lower punches 64, 66 can be referred to as second punches.

In this way, the material of the sintered body, i. e. of tooth 10, can be displaced at the same time in the region of edges 30, 32 and 34, 35 in order to produce the desired crowning.

Since during this pressing process it cannot be ruled out that in the region in which respective two upper and lower punches 60, 62 or 64, 66 are spaced apart from one another (region 73 in FIG. 4), material displacement directed outwards can occur, one or more pressure elements 74, 76 emanating from die 72 or passing through it may be provided in this region, which come to rest in central region 40 of flanks 14, 16. As a result, material displacement cannot take place or cannot take place at all.

Otherwise, the axial pressing process in FIG. 5 takes place like that described in connection with FIG. 4.

The crowning is shaped to fit, i. e. calibration without the need for post-processing. After calibration, the surface of the tooth can be hardened, e.g. by induction hardening, gas hardening, case hardening or similar. In this respect, reference is made to known techniques that are used to produce sintered bodies.

FIG. 6 shows a basic representation of a pressing tool 100 with dies 142 and upper and lower punches 162, 166 and mandrel 168 in order to produce a gear 112 by axial pressing. The inner surface of die 142 has the geometry of the gear rim, whereby the desired crowning can be formed in the teeth during axial pressing.

FIG. 7 shows another example of forming and simultaneously calibrating a crowning in a workpiece by axial pressing—in the exemplary embodiment in the form of a cam 110 that is attached to a shaft 112. Cam 110 is produced by axial pressing, in that pressing dies are displaced axially along an axis which runs perpendicular to end faces 114, 116 of cam 110 in accordance with the teachings of the invention. The crowning can be seen by curved lines 118, 120, 122, 124 running towards the center of cam 110.

The invention claimed is:

1. A method for producing a sintered component in the form of a workpiece having teeth, each tooth having:
   a longitudinal axis, and opposing end faces disposed on the longitudinal axis, wherein a distance between the end faces defines a width of the tooth,
   opposing flanks extending between the end faces, wherein a distance between the flanks defines a thickness of the tooth,
   a crowning formed in the flanks, and extending along the width of the tooth, the crowning having a central region and end regions formed in the flanks, the tooth thickness being smaller in at least one of the end regions than in the central region,
   wherein the tooth is disposed in a die, and a pressing punch acts on the tooth along the longitudinal axis by a pressing punch to form the crowning along the width of the tooth, such that the tooth is calibrated to an exact fit, at least in the central region, by means of axial pressing.

2. The method according to claim 1, wherein the pressing punch acts on the teeth in two positions of the workpiece rotated by 180°, about a second axis running perpendicular to the longitudinal axis.

3. The method according to claim 1, wherein two pressing punches are adjusted relative to one another along the first axis and, on opposite sides, act on the teeth for calibrating the crowning.

4. The method according to claim 1, wherein the die is used as a shaping tool for forming the crowning.

5. The method according to claim 1, wherein the teeth are fixed between two first pressing punches and two second pressing punches, which are adjusted relative to one another, and towards each other, along the first axis, to shape the crowning.

6. The method according to claim 5, wherein, during the relative adjustment of the two first and two second pressing punches, an element acts on the central region of the flank.

7. The method according to claim 1, wherein sintering powder is mixed, compacted, and sintered to form the sintered component, and wherein a compact produced in this way has a substantially homogeneous density.

8. The method according to claim 7, comprising hardening the compact produced in this way, before, or after, forming the crowning.

9. The method according to claim 7, comprising:
compacting the mixed sintering powder to a density D1 in a first pressing step to form a compacted compact,
sintering the compacted compact to form a sintered preform,
compacting the sintered preform to a density D2 in a second compacting step to form a compacted sintered preform,
calibrating the compacted sintered preform,
wherein hardening of the sintered preform is carried out before or after the calibration.

10. The method according to claim 9, wherein the density D1 is adjusted to a value between 6.8 and 7.0 $g/cm^3$, and/or the density D2 is adjusted to a value between 7.3 and 7.6 $g/cm^3$.

11. The method according to claim 1, comprising calibrating an end relief in a lower end and/or an upper end of the tooth by axial pressing.

12. The method according to claim 1, wherein a spur gear or a helical gear with teeth is produced, in whose flanks the crowning is calibrated by axial pressing.

13. The method according to claim 10, wherein the density D1 is adjusted to a value between 6.8 and 6.9 $g/cm^3$.

14. The method according to claim 10, wherein the density D2 is adjusted to a value between 7.4 to 7.5 $g/cm^3$.

15. The method according to claim 1, wherein the tooth is calibrated to an exact fit with simultaneous formation of the crowning.

* * * * *